April 13, 1965   C. H. COVINGTON   3,177,881
COMBINATION UMBRELLA AND FAN

Filed Aug. 2, 1963   2 Sheets-Sheet 1

INVENTOR.
CHARLES H. COVINGTON,
BY
McMorrow, Berman + Davidson
ATTORNEYS.

April 13, 1965 C. H. COVINGTON 3,177,881
COMBINATION UMBRELLA AND FAN
Filed Aug. 2, 1963 2 Sheets-Sheet 2
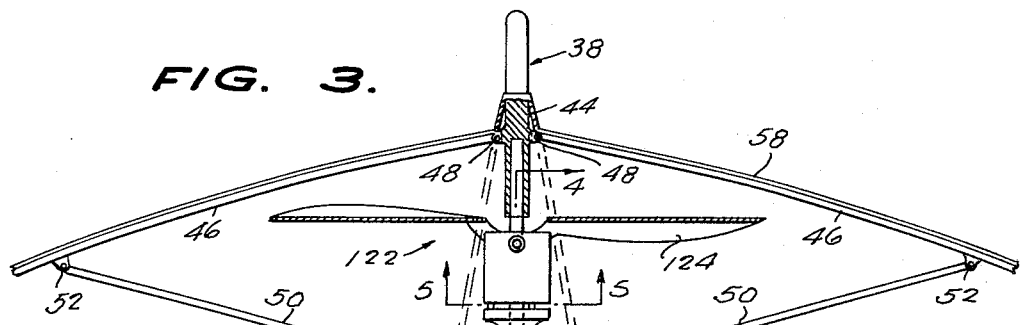
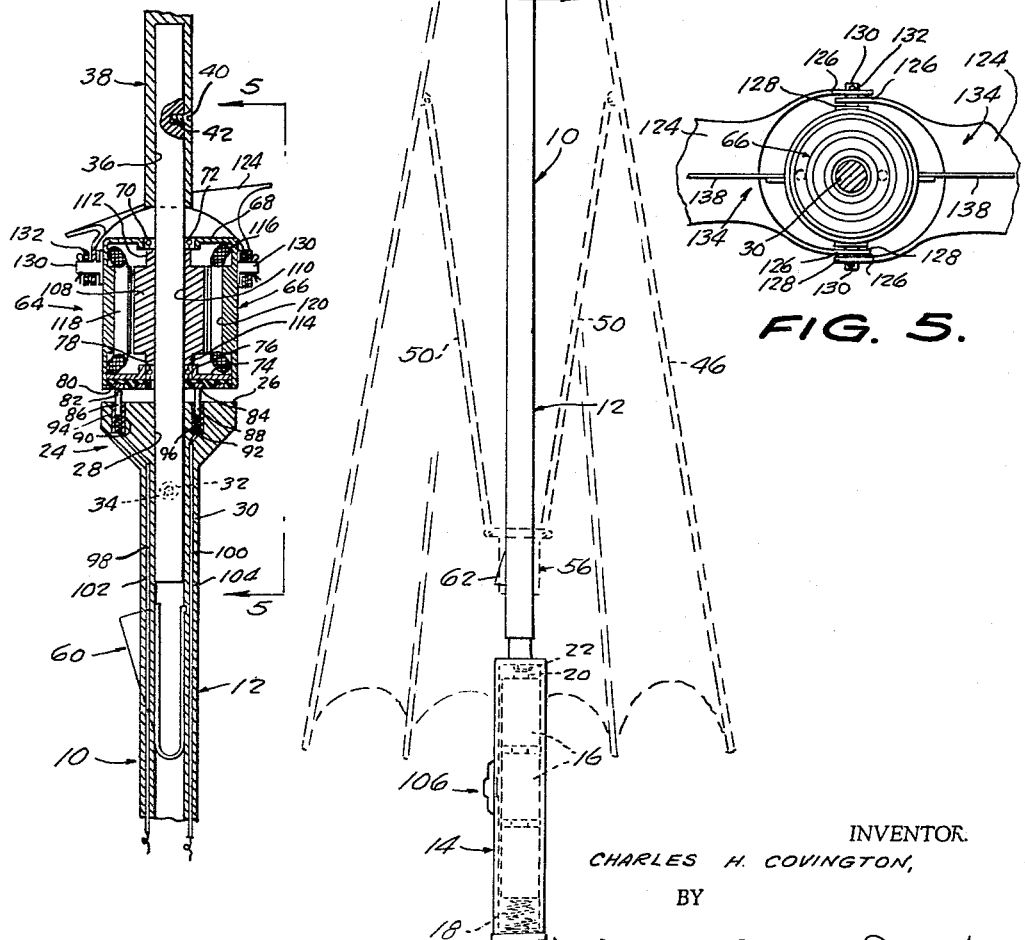
INVENTOR.
CHARLES H. COVINGTON,
BY
McMorrow, Berman & Davidson
ATTORNEYS

United States Patent Office 3,177,881
Patented Apr. 13, 1965

3,177,881
COMBINATION UMBRELLA AND FAN
Charles H. Covington, 1020 Malvern Ave.,
Hot Springs, Ark.
Filed Aug. 2, 1963, Ser. No. 299,512
3 Claims. (Cl. 135—16)

This invention relates to a novel combination umbrella and motor-driven cooling fan.

The primary object of the invention is the provision of an efficient, practical, and highly attractive and useful combination of the kind indicated, which simultaneously affords protection from rain or sun and relief from heat and humidity for the user.

Another object of the invention is the provision of a combination of the character indicated above which enables its construction and use as a personal umbrella, as a beach umbrella, and as a patio umbrella, its fan being driven by an electric motor energized by a battery or batteries in the personal and beach versions, and by suitable service current, in the case of the patio version.

A further object of the invention is the provision of a combination of the character indicated above, wherein a folding fan is located between the cover of the umbrella and its ribs and is supported and driven by an electric motor which is incorporated in the stick or shaft of the combination, the batteries being contained in the handle of the umbrella, the fan being adapted to be folded by the closing of the umbrella.

Other important objects and advantageous features of the invention will be apparent from the following description and the accompanying drawings, wherein, for purposes of illustration only, a specific form of the invention is set forth in detail.

In the drawings:

FIGURE 3 is a vertical transverse section taken on the line 3—3 of FIGURE 1;

FIGURE 4 is an enlarged fragmentary vertical transverse section taken on the line 4—4 of FIGURE 3; and, FIGURE 5 is an enlarged horizontal section taken on the line 5—5 of FIGURE 3.

Figure 1:
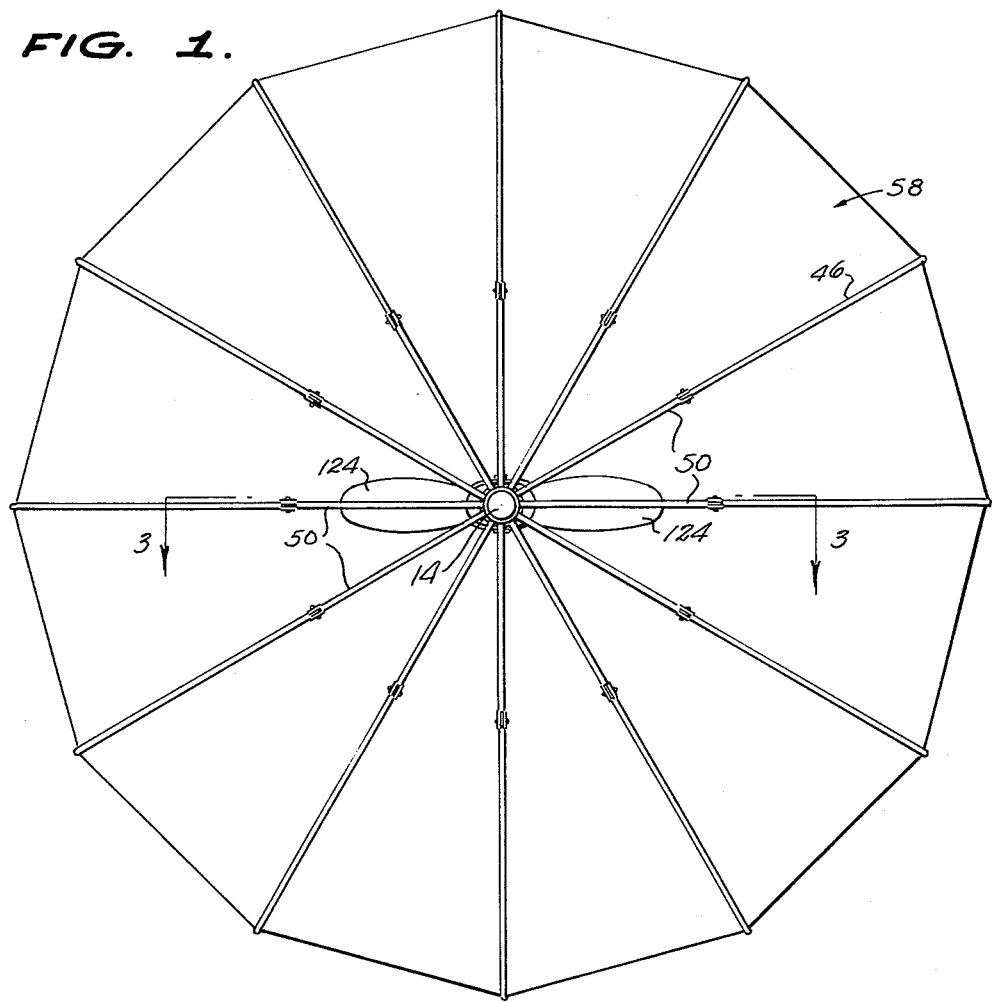
FIGURE 1 is a bottom plan view of a combination in accordance with the present invention.

Referring in detail to the drawings, the illustrated combination comprises a vertically elongated stick 10 composed of a relatively long lower section 12 which is suitably fixed, at its lower end, to the upper end of a hollow cylindrical handle 14 of somewhat larger diameter, and which serves as a container for batteries 16 and has a removable cover 17, on its lower end. The batteries 16 are in end contact with each other, the base contact of the lowermost battery being in forcible contact with a spring 18, and the center contact 20 of the uppermost battery being in contact with a contact arm 22 mounted on the upper end of the handle 14.

As shown in FIGURE 4, the lower stick section 12 terminates in an upwardly flared enlarged diameter head 24 having a flat horizontal upper surface 26, and having an axial bore 28 in line with the bore of the lower section. An intermediate stick section 30, in the form of a solid rod, extends downwardly into the lower section 12, and is fixed in place, as by means of a screw 32 passed through the sidewall of the section 12 and threaded into the intermediate section, as indicated at 34.

The upper part of the intermediate section 30 is inserted upwardly into a socket 36, opening to the lower end of a relatively short upper section 38, which constitutes the tip of the umbrella stick 10, the sections being fixed together, as by means of a screw 40, threaded, as indicated at 42, into the upper section. An intermediate part of the upper section 38 has a downwardly flared retainer 44 fixedly circumposed thereon.

Umbrella ribs 46 are fixedly pivoted, at their inner ends, as indicated at 48, to the upper section 38, at the lower end of the retainer 44, and links 50, shorter than the ribs 46, are pivoted, as indicated at 52, at their outer ends, to the undersides of the ribs, at points intermediate the ends of the latter. The inner ends of the links 50 are pivoted, as indicated at 54, to a slide 56, at the upper end of the slide. The slide 56 slides on the lower stick section 12, from an elevated position, shown in full lines in FIGURE 3, wherein the cover 58, secured on the ribs 46, is in open position, to a disposed position, shown in phantom lines, wherein the ribs are in pendant positions, and the cover is closed. The slide 56 is securably locked in the elevated position, by means of a conventional triangular upper spring-pressed cam detent 60, secured in the lower section 12, and releasably locked, in its depressed position, by means of a similar conventional spring-pressed cam detent 62.

A vertical electric motor 64 is fixedly journalled on the intermediate stick section 30, in the space between the upper stick section 38 and the lower section 12. The motor 64 comprises a vertical cylindrical casing 66, having a top wall 68, with a central flanged opening 70, in which an upper anti-friction bearing 72 is fixed, which surrounds the intermediate section 30. The lower end of the casing 66 is open and has secured therein a plate 74, having a central flanged opening 76, in which a lower anti-friction bearing 78 is fixed, which surrounds and is fixed to the intermediate section 30, whereby the motor casing 66 is rotatably supported upon the intermediate section.

A dielectric disc 80 is secured in and closes the lower end of the motor casing 66 and bears upwardly against the plate 74. The disc 80 has an outer conductive commutator ring 84 embedded in its undersurface, with the undersides of which upwardly spring-pressed outer and inner commutator contact pins 86 and 88, respectively, are engaged.

The contact pins 86 and 88 work in outer and inner metal tubes 90 and 92, which are seated in sockets 94 and 96, respectively, in the upper end of the lower stick section head 24. Wires 98 and 100 lead downwardly from the contact pins, through bores 102 and 104, provided on the lower section 12, and connect with the battery contacts, and on-and-off switch 106 being connected in the wire 98, by means of which the motor 64 can be stopped and started.

Within the motor casing 66 a solid cylindrical armature 108, substantially smaller in diameter than the casing, having an axial vertical bore 110, receiving the intermediate section 30, is formed with reduced diameter bosses 112 and 114, on its ends, which bear against the upper and lower bearings 72 and 78, respectively. Motor field windings 116 spacedly surround the armature 108, and have portions 118 thereof extending vertically through circumferentially spaced bores 120 in thickened portions of the casing sidewall 111, and are suitably connected to the commutation rings.

The motor casing 66 carries a fan 122, which is herein shown as composed of two similar diametrically opposed and oppositely pitched blades 124, of generally elliptical form. As shown in yokes whose arms 126 having overlapping ends 128 which are pivoted on pintles 130 which extend laterally from opposite sides of the motor casing 66, adjacent to the upper end thereof. Cotter pins 132 retain the yoke arms 126 on the pintles.

Figure 2:
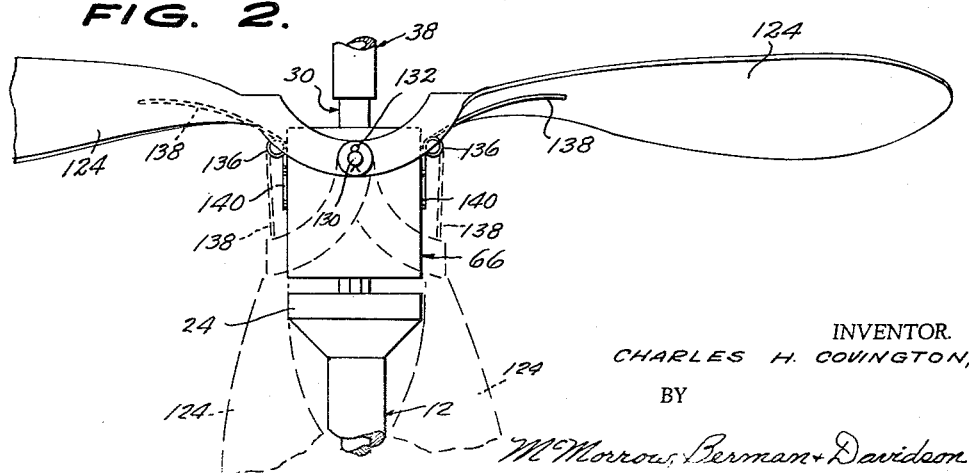
FIGURE 2 is an enlarged fragmentary side elevation thereof, showing the blades of the fan in elevated operative position, in full lines, and in folded position, in phantom lines.

The fan blades 124 are yieldably biased upwardly toward coplanar operative positions, as shown in FIGURE 2, by means of springs 134 having intermediate positions anchored, as indicated at 136, to the exterior of the motor casing 66, at points intermediate the pintles 130. The springs 134 have upper arms 138, which extend laterally outwardly from the casing and bear against the undersides of the fan blades 124, and pendant vertical arms 140 which bear against the opposite sides of the casings.

As indicated in FIGURES 1 and 2, depressing of the slide 56, upon release of the upper detent 60, pivots the ribs 46 downwardly, so that ribs overlying the fan blades 124 engage and push the fan blades downwardly to their pendant depressed positions, shown in phantom lines in FIGURE 2, against the resistance of the springs 134, as the slide 56 reaches and passes behind the lower detent 62. Elevation of the slide 56 to its top position enables the springs 134 to pivot the fan blades 124 to their elevated coplanar positions.

It is evident that the fan 122 can be operated only in the open position of the umbrella, but need not be operated unless desired by the user of the combination, for cooling purposes.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In a combination of the character described, an umbrella component having a stick terminating at its upper end in a tip, ribs pivoted at their inner ends on the tip, a slide slidably engaged on the stick, links pivoted at their inner ends to the slide and at their outer ends to the ribs, an electric motor mounted around the stick between the ribs and the links, and means for energizing the motor, said stick comprising a tubular lower section, having an enlarged diameter head on its upper end, an intermediate section having its lower end securably engaged in the base of the lower section, and an upper section constituting said tip, said upper section having a socket opening to its lower end in which the upper end of the intermediate section is receivably engaged, said motor comprising a vertical casing axially and fixedly journalled on said intermediate section, an armature within the casing and surrounding the intermediate section, insulated concentric outer and inner commutator rings on the lower end of the casing, upwardly spring-pressed outer and inner commutator contact pins on said head severally engaged with the commutator rings, said casing containing a field winding traversing the armature to which said contact rings are severally connected, fan blades pivoted on said casing, said energizing means being connected to the contact pins.

2. In a combination of the character described, an umbrella component having a stick terminating at its upper end in a tip, ribs pivoted at their inner ends on the tip, a slide slidably engaged on the stick, links pivoted at their inner ends to the slide and at their outer ends to the ribs, an electric motor mounted around the stick between the ribs and the links, a fan operatively carried by the motor at its upper end, and means for energizing the motor, said stick comprising a tubular lower section, having an enlarged diameter head on its upper end, an intermediate section having its lower end securably engaged in the base of the lower section, and an upper section constituting said tip, said upper section having a socket opening to its lower end in which the upper end of the intermediate section is securably engaged, said motor comprising a vertical casing axially and fixedly journalled on said intermediate section, an armature within the casing and surrounding the intermediate section, insulated concentric outer and inner commutator rings on the lower end of the casing, upwardly spring-pressed outer and inner commutator contact pins on said head severally engaged with the commutator rings, said casing containing a field winding traversing the armature to which said contact rings are severally connected, said energizing means being connected to the contact pins, said fan comprising oppositely directed pitched blades pivoted at their inner ends on the motor casing, and spring means connected to the motor casing and the blades and yieldably urging the blades upwardly toward horizontal operative position beneath related ribs.

3. In combination of the character described, an umbrella component having a stick terminating at its upper end in a tip, ribs pivoted at their inner ends on the tip, a slide slidably engaged on the stick, links pivoted at their inner ends to the slide and at their outer ends to the ribs, an electric motor mounted around the stick between the ribs and the links, a fan operatively carried by the motor at its upper end, and means for energizing the motor, said stick comprising a tubular lower section, having an enlarged diameter head on its upper end, an intermediate section having its lower end securably engaged in the base of the lower section, and an upper section constituting said tip, said upper section having a socket opening to its lower end in which the upper end of the intermediate section is securably engaged, said motor comprising a vertical casing axially and fixedly journalled on said intermediate section, an armature within the casing and surrounding the intermediate section, insulated concentric outer and inner commutator rings on the lower end of the casing, upwardly spring-pressed outer and inner commutator contact pins on said head severally engaged with the commutator rings, said casing containing a field winding traversing the armature to which said contact rings are severally connected, said energizing means being connected to the contact pins, said fan comprising oppositely directed pitched blades pivoted at their inner ends on the motor casing, and spring means connected to the motor casing and the blades and yieldably urging the blades upwardly toward horizontal operative position beneath related ribs, said blades having yokes on their inner ends embracing the motor casing, opposed lateral pintles on the motor casing on which the yokes are pivoted.

References Cited by the Examiner

UNITED STATES PATENTS

| 1,006,531 | 10/11 | Carroll | 135—20 |
| 1,148,332 | 7/15 | Onyskow | 135—16 |
| 1,824,192 | 9/31 | Bouma | 135—28 |
| 2,547,896 | 4/51 | Wellen | 135—16 |
| 2,627,217 | 2/53 | Hainke et al. | 135—16 |
| 2,817,281 | 12/57 | Schwan et al. | 135—16 |

HARRISON R. MOSELEY, *Primary Examiner.*

CHARLES E. O'CONNELL, *Examiner.*